UNITED STATES PATENT OFFICE.

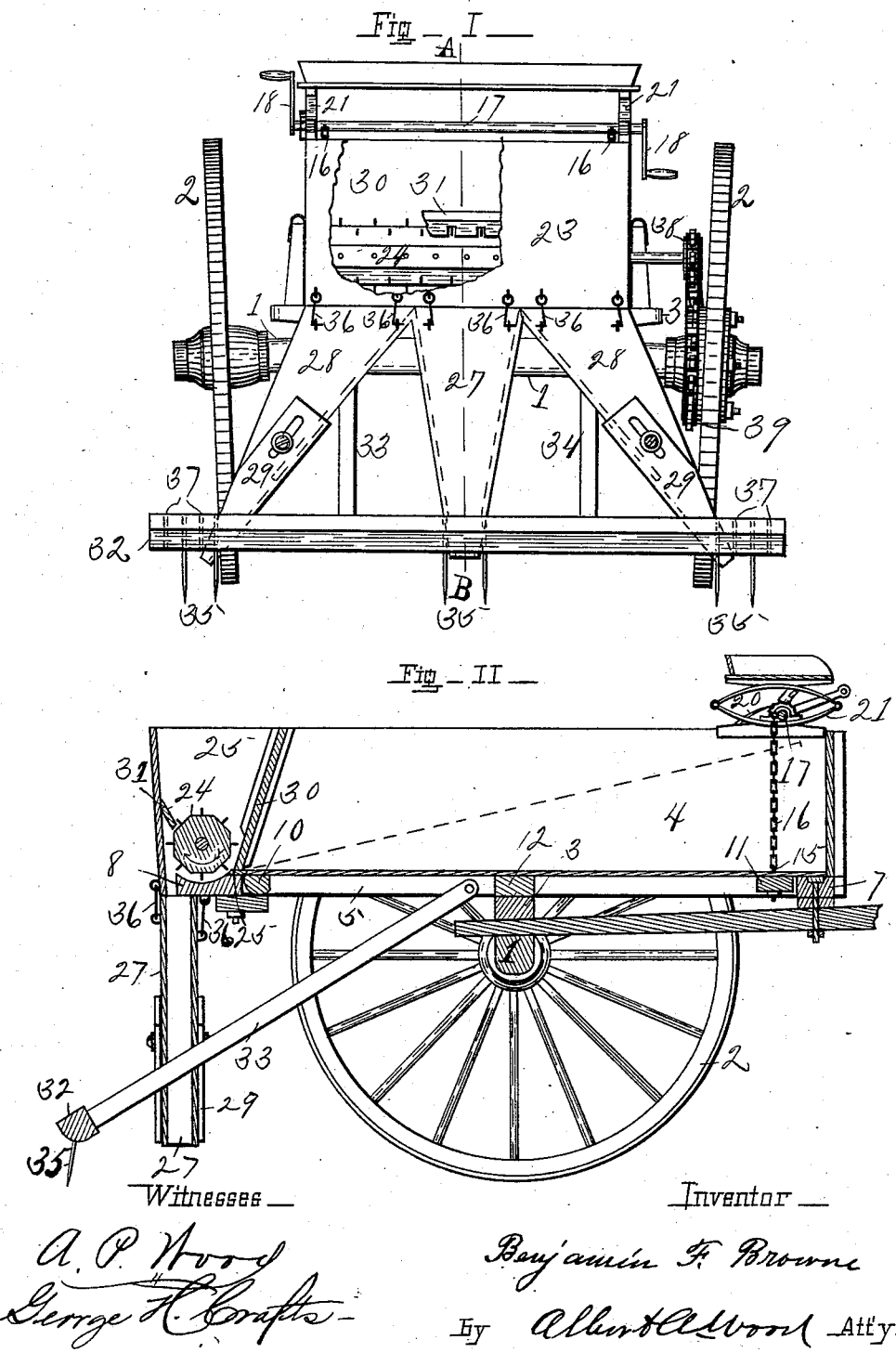

BENJAMIN F. BROWNE, OF STOREVILLE, SOUTH CAROLINA.

FERTILIZER-DISTRIBUTER.

SPECIFICATION forming part of Letters Patent No. 365,429, dated June 28, 1887.

Application filed September 23, 1886. Serial No. 214,382. (No model.)

*To all whom it may concern:*

Be it known that I, BENJAMIN F. BROWNE, a citizen of the United States, residing at Storeville, in the county of Anderson and State of South Carolina, have invented a new and useful Fertilizer-Distributer; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of fertilizer-distributers which are attached to the rear end of a wagon or cart, and that are driven by the power derived from the wheel of said wagon or cart; and it consists in details, as will be hereinafter fully described.

In the accompanying drawings, Figure I is a rear view showing the distributing-spouts and other details. Fig. II is a longitudinal vertical section on the line A B, Fig. I.

Like reference-marks refer to like parts in the several figures.

In these drawings, 1 is an axle, and 2 the wheels, of a cart or the hind wheels, of a wagon. 3 is the bolster, and 4 the box or body. This box or body consists of a rectangular frame composed of the side rails, 5, and the cross-pieces 7 and 8, and rests on the bolster 3. The bottom of the box 4 is pivoted by the cleat 10, which is attached to the boards of the bottom at one end, and at the other end is attached the cleat 11. The cleat 12 supports the center of the bottom and rests on the bolster. To the cleat 11 are attached, by eyebolts 15, the chains or ropes 16, the upper ends of which wind around the shaft 17, which acts as a windlass, by which they are wound up by means of the cranks 18. The ratchet and pawl 19 and 20 hold the windlass in the position to which it is turned. The shaft 17 is mounted on bearings attached to the seat-springs 21.

23 is a hopper, in which is a spiked polygonal cylinder, 24. The cross-piece 8 is concaved to form, with the piece 25, a guide for the fertilizer in passing from the hopper to the chutes 27 and 28. The side 30 of the hopper is removable by being withdrawn edgewise. The notched board 31 prevents the fertilizer from being discharged over the back side of the roller. The chutes or spouts 27 and 28 are attached to the hopper by the hooks 36, and conduct the fertilizer to the furrows, that should be previously prepared for that purpose. Extension-pieces 29 are on the outer ends of the chutes 28. The beam 32 is attached to the frame of the body by the pieces 33 and 34, and is provided with teeth 35, which combination forms a harrow to cover the fertilizer. The cylinder 24 is driven by an endless chain, which connects sprocket-wheels 38 and 39 on the cylinder-shaft and hub of one wagon-wheel.

The fertilizer to be dis'ributed is placed in the box, in which it may be hauled to the field, and from which it is distributed by being thrown into the hopper, from which it will be carried by the spiked cylinder 24. The spiked cylinder 24 runs in the direction indicated by the arrow, Fig. II, and carries the fertilizer over the concave, the flat sides of the cylinder having a tendency to keep it from clogging to the chutes or spouts, by which it is divided into three or any other number of parts, according to the number of spouts, and discharged on the ground. The extension-pieces 29 are adjusted to give the sloping chutes a length that will discharge the fertilizer at a proper distance from the center spout. If it is desired to spread the fertilizer broadcast, the chutes may be removed by unhooking them from the hopper and frame.

If the fertilizer to be distributed is of such a nature that it will readily slide down an inclined surface, the side 30 of the hopper may be removed and the bottom of the box be elevated by the windlass as much as is necessary to cause the fertilizer to slide to the cylinder. It is obvious that the latter way will be a saving of labor in all cases where the fertilizer will slide down the inclined bottom; but as experience shows that some kinds of fertilizer cannot be handled in that way, it is my object to supply a device that may be readily adapted to the condition of the material to be handled.

It being my object to construct a machine that will not only be cheaply constructed, but economically operated, I attach a harrow, 35, as shown, to cover the fertilizer as fast as distributed, thereby not only saving time and labor, but preventing the escape of gases that will result from an exposure for any length of time in the sun. The teeth are adjustable by placing them in the extra holes 37, Fig. I, which holes may be of any number and in any desired part of the harrow-bar.

I am aware that a fertilizer-distributer has been invented having the bottom of the wagon-box in two pieces, each of which is hung upon pivots or hinges, so that one end of each may be raised or lowered by means of a windlass, and the fertilizer carried out from between the ends of said bottom pieces by means of a rotating spiked cylinder, as shown in Patent No. 100,762, and do not therefore claim such construction.

Having described my invention, what I claim as new, and desire to secure by Letters Patent of the United States, is—

1. In a fertilizer-distributer, the combination of the wheels and axle of a wagon or cart, with a box or body having a tilting bottom, a hoisting-windlass and a chain to raise the front end of said bottom, and a hopper at the rear of the body, with a movable partition forming its front side, and a spiked cylinder adapted to discharge the fertilizer from the bottom of the hopper to the ground, substantially as described.

2. In a fertilizer-distributer, the combination of the spiked polygonal cylinder 24, the hopper, having a notched board, 31, and removable side 30, with the chutes 27 and 28, attached thereto, having extension-pieces 29, substantially as shown and described, and for the purpose specified.

3. In a fertilizer-distributer, the combination of the wagon or cart having a tilting bottom, with a hopper, a spiked polygonal cylinder in the bottom of said hopper, and a harrow provided with adjustable teeth, and hinged to the wagon-body for the purpose of covering the fertilizer as distributed, substantially as shown and described.

In testimony whereof I affix my signature in presence of two witnesses.

BENJAMIN F. BROWNE.

Witnesses:
A. P. WOOD,
JOHN J. WOODSIDE.